United States Patent
Kerr

[15] 3,682,996
[45] Aug. 8, 1972

[54] ZEOLITE ESTERS
[72] Inventor: George T. Kerr, Trenton, N.J.
[73] Assignee: Mobil Oil Corporation
[22] Filed: Feb. 24, 1970
[21] Appl. No.: 13,784

[52] U.S. Cl. ............260/448 C, 252/428, 252/455 Z, 260/448.8 R
[51] Int. Cl. ............................C07f 5/06, B01j 11/40
[58] Field of Search ......252/455 Z, 428; 260/448 C, 260/448.8 R; 23/111–113

[56] References Cited

UNITED STATES PATENTS

| | | |
|---|---|---|
| 3,398,177 | 8/1968 | Stewart...................260/448.2 |
| 3,228,889 | 1/1966 | Garwood et al. ..........252/428 |
| 3,329,726 | 7/1967 | Landis et al. .......260/448.8 X |

*Primary Examiner*—C. F. Dees
*Attorney*—Oswald G. Hayes, Andrew L. Gaboriault, Raymond W. Barclay and James F. Woods

[57] ABSTRACT

As a novel composition of matter a crystalline alumino-silicate ester made by reacting a crystalline aluminosilicate having an available hydrogen atom with an organic silane having a SiH group.

13 Claims, No Drawings

3,682,996

ZEOLITE ESTERS

BACKGROUND OF THE INVENTION

FIELD OF THE INVENTION

This invention relates to zeolite esters. More particularly, this invention relates to zeolite esters made by reacting a crystalline aluminosilicate having an available hydrogen atom with an organic silane.

SUMMARY OF THE INVENTION

Broadly, this invention contemplates a zeolite ester which is the reaction product of a crystalline aluminosilicate zeolite having an available hydrogen atom with an organic silane.

The zeolite esters of the present invention have a structure which comprises the moiety:

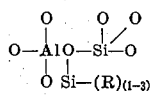

wherein R is independently at least one organic radical, suitably aryl, alkyl, acyl, aralkyl. Preferably, the organic radical is alkyl since alkyl zeolite esters are easier to prepare due to the pore structure of the zeolites which more readily accept alkylsilane reactants than arylsilane reactants, for example.

Preparation of the zeolite esters can be represented by the following equation:

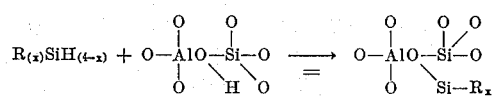

wherein $x$ is between 1 and 4 and R is the aforesaid organic radical.

DESCRIPTION OF SPECIFIC EMBODIMENTS

The acid sites in hydrogen zeolites are generally regarded as having the structure:

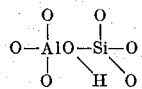

Infrared studies suggest the presence of silanol groups in hydrogen zeolites; if this is correct, some disruption of the bonding between aluminum and the silanol oxygen should occur. According to this model, hydrogen zeolites can be visualized as being simultaneously Lewis acids and proton acids. These acid sites, acting in conjunction with one another, may explain the strong proton acidity of hydrogen zeolites. Silica gel, containing many silanol groups, but no Lewis acid sites, is essentially non-acidic compared with hydrogen zeolites. It has been found that trialkylsilanes do not react with carboxylic acid or alcohols unless the reaction is catalyzed by Lewis acids or proton acids; they react readily depending on steric hindrance problems with hydrogen zeolite or other zeolites having an available hydrogen group for reaction. Similarly, dialkylsilanes react with even greater ease with hydrogen zeolites due to the fact that dialkylsilanes, especially dimethyl-silane, do not present as severe a steric hindrance as do the tri-substituted silanes. It has been found that proton-containing faujasites react readily with di- and trisilanes do yield the first known zeolitic esters in accordance with the reaction postulated below. Hydrogen is the main byproduct of these reactions. As indicated above, the zeolite to be reacted must have an available hydrogen atom for reaction with the silane. Thus, while the zeolite species can be any of the known zeolites including especially those having a pore size between 4 and 15 Angstroms, the zeolite must have an available hydrogen atom for reaction. Thus, particularly contemplated zeolites are the hydrogen zeolites such as hydrogen zeolite Y and hydrated rare earth exchanged zeolites such as rare earth exchanged zeolites X and Y. The zeolite species which can be reacted if they have an available hydrogen group include zeolites A, Beta, erionite, offretite, mordenite, ZK-4, ZSM-3 and ZSM-4 as well as other natural or synthetic zeolites heretofore known.

While one zeolite species can be reacted, it is preferred that the pore size be greater than 7 Angstroms in diameter since such pore size will readily accommodate the organosilane into the porous structure of the crystalline aluminosilicate. Accordingly, more proton sites will be available for reaction with the silane and more SiH groups can be formed within the zeolitic structure.

The choice of the specific silanes employed is generally dependent upon the specific zeolite to be reacted. If the zeolite is a very large pore zeolite, the choice of silane is not especially critical since the zeolite will adsorb the specific silane employed. Generally speaking, the silane should not present steric hindrance problems with the zeolite species. Preferably, the alkyl group of an alkyl silane is between one and four carbon atoms in chain length. The more reactive species such as the methyl-substituted silanes are desirable. Evidence of steric hindrance is found in the fact that while hydrogen Y contains 50 protons per unit cell, approximately 20 to 25 of these protons undergo reaction with trimethylsilane, about 30 protons react with dimethyl-silanes. These observations suggest that steric hindrance masks some of the protons.

The term "silane," as used herein, contemplates those compounds comprising silica bonded to other atoms or radicals. They are analogous in terms of nomenclature to methane with the exception that silicon is the principal atom instead of carbon. Similarly, the silane can be a substituted one in which one of the hydrogen atoms bonded to the silica has been replaced by a group such as an amine group in which case the resultant product is a silazane. Other substituted substituents which react so that there is cleavage between the silica and the substituent to form a radical which reacts with the hydrogen of the crystalline alumino-silicate are similarly contemplated, for example, silanols. To illustrate a reaction of a trialkyl substituted silazane, the following reaction example is set forth. The aluminosilicate reactant is represented by the molecular arrangement of a portion of the silica-alumina framework. The reaction proceeds in accordance with the following formula:

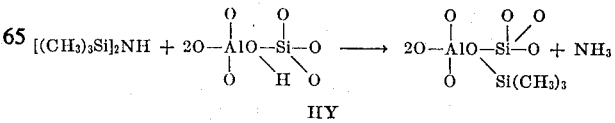

HY

This reaction occurs readily at room temperature as evidenced by a very rapid uptake of the amine by the zeolite initially. After 2–4 minutes, the rate of amine uptake decreases by a factor of about 10. Finally, after three to four hours, approximately 24 g. of amine/100 g. of zeolite is adsorbed. On purging with helium and heating to 400°, approximately one-half of the sorbate is desorbed. However, the retention of 10-12 percent sorbate at these temperatures indicated that the expected reaction occurs, particularly since the solid product showed no coking nor other evidence of thermal decomposition. Physically adsorbed materials, such as benzene and cyclohexane, are completely desorbed from the hydrogen zeolite Y at 250°–300° under these conditions.

REACTIONS WITH TRIMETHYLSILANE

The use of hexamethyldisilazane for replacing zeolitic protons with trimethylsilyl groups is complicated by the formation of ammonia which, of course, can react with protons to yield ammonium ions and thereby diminish the proton concentration in the zeolite. The reaction of HY with trimethylsilane is as follows:

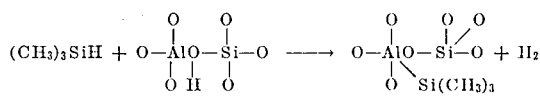

At 250°, hydrogen zeolite Y very rapidly (in about one minute) sorbs 14.0 ± 0.5 percent trimethylsilane and termination of sorption occurs sharply. Purging and heating to 350° effects little or no desorption.

It has been found that the hydrogen form of a zeolite such as zeolite Y readily reacts rapidly with dimethylsilane at 250° C. With hydrogen Y, approximately 30 dimethylsilane molecules are irreversibly sorbed per unit cell of zeolite. Triethylsilane is sluggishly sorbed at the same temperature; approximately 12 molecules per unit cell appear to react. This may be due to steric hindrance. The experimental results determined similarly establish that silane containing at least one SiH bond undergo reaction with hydrogen zeolites, especially X and Y, to yield the first know zeolitic esters. Evidence that some steric hindrance can be encountered is supported by the fact that over twice as many dimethylsilyl groups are incorporated into zeolite Y as triethylsilyl groups. Trimethylsilyls have a size intermediate these latter groups. At room temperature, hydrogen Y can sorb a total of 20 percent trimethylsilane while only about 14 percent is irreversibly adsorbed at 250° C. This suggests that trimethylsilyl groups bonded to zeolitic oxygens mask about one-half of the total protons in hydrogen zeolite Y and thereby preclude reaction of the masked protons with trimethylsilane. The resultant product is useful for various hydrocarbon conversion reactions such as cracking, hydrocracking, alkylation, and isomerization. The zeolite esters have been found to sorb substantially lesser quantities of cyclohexane, normal hexane and water than the parent zeolite which is reacted with the silane. Thus, the product of reaction of hydrogen zeolite Y and trimethylsilane sorbs about 60 percent as much cyclohexane, n-hexane and water as does the parent hydrogen zeolite. As such catalytically-active forms can be employed in certain shape selective catalyzed reactions due to the substantial decrease in sorption properties, only molecules of special size will pass through the zeolite and undergo a catalytic change.

In order to more fully illustrate the nature of the present invention and the manner of practicing the same, the following examples are presented:

EXAMPLE 1

39.4 Grams of the hydrogen form of zeolite Y were contacted with 5.3 grams of trimethylsilane at 250° C. Hydrogen zeolite Y reacted readily with the trimethylsilane to yield a product having a substantial number of trimethylsilyl groups per unit cell.

The hydrogen zeolite Y had been prepared by calcination of the ammonium form under vacuum in a high vacuum system. The trimethylsilane was introduced into a portion of the system containing the hydrogen zeolite. After several minutes contact time, the unreacted portion of the silane was collected in a liquid nitrogen trap as frozen solid. This procedure was repeated several times until the quantity of noncondensed gas remained constant.

EXAMPLE 2

In the same manner as that of Example 1, a rare earth exchanged zeolite Y weighing 37.5 mgs. was contacted with 3.0 mgs. of trimethylsilane to yield a product having trimethylsilyl groups within each unit cell. The hydrogen sites in the zeolite arise from hydrolysis of the rare earth ions as follows:

EXAMPLE 3

40.8 mgs. lanthanum exchanged Y were contacted in the manner of Example 1 with 4.0 mgs. of trimethylsilane to yield a product containing a silyl group in the zeolite framework.

EXAMPLE 4

48.9 mgs. of rare earth exchanged X were contacted in the manner of Example 1 with 4.2 mgs. trimethylsilane to yield a product containing a silyl group in the zeolite framework.

EXAMPLE 5

41.6 mgs. of rare earth exchanged hydrogen X were contacted in the manner of Example 1 with 5.0 mgs. trimethylsilane to yield a product containing a silyl group in the zeolite framework.

EXAMPLE 6

46.8 mgs. of lanthanum exchanged zeolite X were contacted in the manner of Example 1 with 4.0 mgs. trimethylsilane to yield a product containing a silyl group in the zeolite framework.

The novel zeolite of this invention can contain a hydrogenation-dehydrogenation component, such as an oxide of a metal, a sulfide of a metal, or a metal of Groups VI and VIII of the Periodic Table, and manganese. Representative elements which can be incorporated in the zeolite are cobalt, nickel, platinum, palladium, ruthenium, rhodium, osmium, iridium, chromium, molybdenum, and tungsten. The most preferred metals are platinum, palladium, nickel, zinc and cadmium. These materials either in their elemental form, as oxides, or sulfides can be impregnated into the zeolite or in cationic form can be exchanged into the zeolite for a sodium or potassium cation. The methods for impregnation and/or exchange are those commonly used in the art. These hydrogenation-dehydrogenation components can be intimately combined by other means, as by physical admixture. The resultant catalyst, especially in a form containing less than 4 percent by weight alkali metal, preferably less than 3 percent, is useful in hydrocracking and reforming as well as other processes involving hydrogenation or dehydrogenation.

Employing the catalyst of this invention, lighter petroleum stock and similar lower molecular weight hydrocarbons can be hydrocracked at temperatures between 400° F. and 825° F. using molar ratios of hydrogen to hydrocarbon charge in the range between 2 and 80. The pressure employed will vary between 10 and 2000 psig. and the liquid hourly space velocity between 0.1 and 10.

Employing a form of the catalyst not containing a hydrogenation-dehydrogenation component, the catalyst can be employed for catalytic cracking, using a liquid hourly space velocity between about 0.5 and 50, a temperature between about 550° F. and 1200° F. and a pressure between subatmospheric and several hundred atmospheres.

Additionally, catalytically-active forms of the zeolite of this invention find extensive utility in a wide variety of hydrocarbon conversion processes including hydroisomerization, hydrodealkylation, hydrodisproportionation, hydrocarbon oxidation, dehydrogenation, desulfurization, hydrogenation, hydrocracking, polymerization and the like provided, of course, that the reactant to undergo conversion can enter the pores of the zeolite and the product can be removed from within the zeolite.

I claim:

1. A zeolite ester having a structure which comprises the moiety:

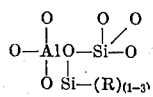

wherein R is independently at least one organic radical, said organic radical selected from the group consisting of aryl, alkyl, acyl and aralkyl.

2. A zeolite ester according to claim 1 wherein R is methyl.

3. A zeolite ester according to claim 2 wherein there are three methyl groups per moiety.

4. A zeolite ester prepared by reacting a crystalline aluminosilicate zeolite having an available hydrogen atom with an organic silane, said organic silane having the formula $R_{(x)}SiH_{(4-x)}$ wherein R is selected from the group consisting of aryl, alkyl, acyl and aralkyl.

5. A method of preparing crystalline alumino-silicate zeolite esters which comprises contacting an organosilane with a crystalline aluminosilicate zeolite having an available hydrogen atom under conditions effective for formation of the crystalline aluminosilicate zeolite ester, said organosilane having from 1 to 4 alkyl groups per silicon molecule, each alkyl group having from 1 to 4 carbon atoms in chain length.

6. A method according to claim 5 wherein the crystalline aluminosilicate is the hydrogen form of zeolite Y and the silane is a trialkyl substituted silazane.

7. A method according to claim 6 wherein the trialkyl substituted silazane is trimethylsilazane.

8. A method according to claim 5 wherein the organo-silane is trimethylsilane.

9. A method according to claim 5 wherein the silane is hexamethyldisilazane.

10. A method according to claim 5 wherein the crystalline aluminosilicate zeolite is a rare earth exchanged crystalline aluminosilicate.

11. A method according to claim 10 wherein the crystalline aluminosilicate is a rare earth exchanged hydrogen zeolite X.

12. A method according to claim 5 wherein the crystalline aluminosilicate is a rare earth exchanged zeolite Y.

13. A method according to claim 5 wherein the zeolite is a lanthanum exchanged zeolite X.

* * * * *

UNITED STATES PATENT OFFICE
CERTIFICATE OF CORRECTION

Patent No. 3,6_2,996      Dated August 8, 1972

Inventor(s) George T. Kerr

It is certified that error appears in the above-identified patent and that said Letters Patent are hereby corrected as shown below:

Column 3, line 29    "  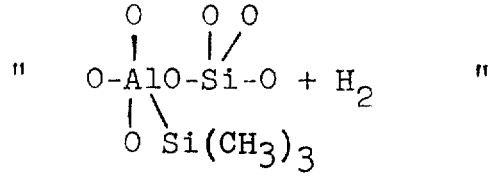  "

should be

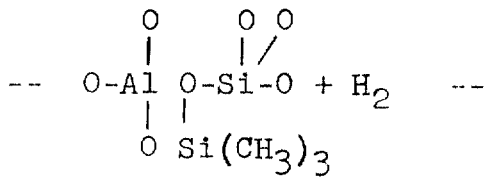

Signed and sealed this 20th day of February 1972.

(SEAL)
Attest:

EDWARD M. FLETCHER, JR.
Attesting Officer

ROBERT GOTTSCHALK
Commissioner of Patents